(12) United States Patent
Carpenter

(10) Patent No.: US 6,254,034 B1
(45) Date of Patent: Jul. 3, 2001

(54) TETHERED AIRCRAFT SYSTEM FOR GATHERING ENERGY FROM WIND

(76) Inventor: Howard G. Carpenter, 7667 Kelley Dr., Apt. 13, Stockton, CA (US) 95207-1154

( * ) Notice: Subject to any disclaimer, the term of this patent is extended or adjusted under 35 U.S.C. 154(b) by 0 days.

(21) Appl. No.: 09/399,117

(22) Filed: Sep. 20, 1999

(51) Int. Cl.[7] .................................................. B64C 31/06
(52) U.S. Cl. ..................................................... 244/153 R
(58) Field of Search ........................... 244/153 R, 153 A, 244/154

(56) References Cited

U.S. PATENT DOCUMENTS

| | | | |
|---|---|---|---|
| 3,887,817 | * | 6/1975 | Steelman ................................ 290/43 |
| 3,924,827 | * | 12/1975 | Lois ................................... 244/153 R |
| 3,987,987 | * | 10/1976 | Payne et al. ...................... 244/153 R |
| 4,073,516 | * | 2/1978 | Kling ..................................... 290/55 |
| 4,076,190 | * | 2/1978 | Lois ................................... 244/153 R |
| 4,124,182 | * | 11/1978 | Loeb .................................. 244/153 R |
| 4,166,596 | * | 9/1979 | Mouton, Jr. et al. ................... 244/30 |
| 4,251,040 | * | 2/1981 | Loyd ...................................... 244/154 |
| 4,285,481 | * | 8/1981 | Biscomb ................................. 244/33 |
| 4,309,006 | * | 1/1982 | Biscomb ................................. 244/33 |
| 5,533,694 | * | 7/1996 | Carpenter ......................... 244/153 R |
| 5,931,416 | * | 8/1999 | Carpenter ......................... 244/155 A |

\* cited by examiner

*Primary Examiner*—Peter M. Poon
*Assistant Examiner*—Kevin Jakel

(57) ABSTRACT

The tethered aircraft of the system is blown by wind to travel downwind at a controlled rate for maximal mechanical energy gathering from wind whose velocity fluxuates and gusts. A cycle of travel is completed when the aircraft is travelled upwind to the site of the beginning of downwind travel where downwind travel is recommenced. The downwind travelling aircraft pullingly unwinds its tether from an anchored windlass drum to spin the rotor of an interconnected electrical machine to convert the mechanical energy to electricity.

11 Claims, 7 Drawing Sheets

GRAPHS OF THEORETICAL PERCENT OF MAXIMUM AVAILABLE POWER, $P_o$, FROM A TETHERED AIRCRAFT, CONTROLLED TO FLY AT VARIOUS ANGLES-OF-ATTACK, $\alpha$, IN A PARTICULAR WIND, VERSUS THE DOWNWIND-TRAVEL-RATE, $v_t$, OF THE AIRCRAFT.

GRAPH OF DOWNWIND-TRAVEL-RATES, $v_t$, ft/sec, OF A TETHERED AIRCRAFT, AT MAXIMUM POWER GENERATION, THAT IS CONTROLLED TO FLY AT A 50° ANGLE-OF-ATTACK, VERSUS WIND VELOCITY, $V_o$, ft/sec.

TETHERED AIRCRAFT SYSTEM FOR GATHERING ENERGY FROM WIND

BACKGROUND—FIELD OF THE INVENTION

This invention relates to a tethered aircraft, specifically to a tethered aircraft system for gathering energy from wind.

BACKGROUND—CROSS REFERENCES TO RELATED PATENTS

This invention includes remotely-controlled angles-of-attack as defined in U.S. Pat. No. 5,931,416, TETHERED AIRCRAFT HAVING REMOTELY-CONTROLLED ANGLE-OF-ATTACK, Aug. 3, 1999; which definition depends, in turn, upon the location of the resultant in U.S. Pat. No. 5,533,694, METHOD FOR LOCATING THE RESULTANT OF WIND EFFECTS ON TETHERED AIRCRAFT, Jul. 9, 1996; both patents to me, Howard G. Carpenter.

BACKGROUND—DESCRIPTION OF THE PRIOR ART

In the present invention the wind blows a tethered aircraft downwind. The rotor of a generator spins and electricity is generated as the downwind travelling aircraft pulls its tether off a drum that drives the rotor. The aircraft is an old time tractor kite with modern day control technology.

Excerpting above cited U.S. Pat. No. 5,931,416, "Kites were used to tow wagons and boats. But the drawback was that there were no means to adjust the flight characteristics of the kites to accomodate gusting and changing winds. Many, it is thought most, of the schemes were tested long before the development of flight controls. Without control apparatus flight becomes erratic in gusting and changing winds. Flight becomes translational and rotational and sometimes crashing. Lives were lost in man lifting operations. The tractors were erratic and there were crashes, sometimes fatal. But, for the most part, after the development of airplanes and the myriad technological advances of this century, profitable applications of kites have declined. So that the application of feedback controls and the like to kites, tethered aircraft, has languished." It is that tractors without control cannot be an economical part of an energy gathering system; such tractors without control cannot substitute for rotary windmills.

World wide, windmills in wind-farms are a significant source of electrical power. Most are horizontal axis mills atop ground mounted towers. Others are ground mounted vertical axis mills. These mills, wind turbines, are limited by economics to low altitude winds—winds near the ground. The cost to make ground mounted mills higher cannot be recovered by the value of the energy gained from the increased height.

Patents for systems that have neither ground mounted towers or frameworks have issued. These systems extract energy from wind at higher altitude than the height of tower mounted windmills. Significant quantities of the energy of higher altitude winds are not currently gathered. It is not known that any of these patented systems have become economically feasible or technically practical. U.S. patents include:

U.S. Pat. No. 3,924,827, 1975, Lois; U.S. Pat. No. 4,073,516, 1978, Kling; U.S. Pat. No. 4,166,596, 1979, Mouton, Jr. et al; U.S. Pat. No. 4,285,481, 1979, Biscomb, and U.S. Pat. No. 4,309,006, 1982, Biscomb The Lois patent, APPARATUS FOR EXTRACTING ENERGY FROM WINDS AT SIGNIFICANT HEIGHT ABOVE THE SURFACE, is for a plurality lifting-gas filled, tethered, floating wings whose tethers spin an electrical, ground-anchored, generator as the wings are blown downwind. Each wing may include a tiltable, aerodynamic lifting-wing.

The sail form wings are balloons that float downwind and upwind at more or less constant altitude. When the downwind travel of a wing is finished the other similar wings, travelling downwind, pull it in, by a system of gears and pulleys, for another trip downwind. To maximize power generation the rate of downwind travel is restrained to be about one third the velocity of the wind. On board, modulating flight controls are not included.

The Kling patent, WIND DRIVEN POWER PLANT, is for detailed improvements of dynamos on board captive balloons. Dynamos on captuve balloons is old art. The plant aloft includes an aerostatic suspension body, which is a kind of balloon, a rotor assembly, a current generator, and alignment means. At least one of a plurality of captivating stays includes a power cable from the aircraft aloft to a ground station.

The Mouton, Jr. et al patent, AIRSHIP POWER TURBINE, is based upon an endless belt that is driven by an airborne windmill fan. The belt drives a generator on the ground. The windmill fan is supported aloft by a tubular form gas-filled balloon. The fan, a rotor, is driven by wind to rotate within the center core of the toroidial form balloon which is at high altitude and stayed from the ground. This Mouton patent makes no significant mention of flight controls.

The Biscomb patents, MULTIPLE WIND TURBINE TETHERED AIRFOIL WIND ENERGY CONVERSION SYSTEM and TETHERED AIRFOIL WIND ENERGY CONVERSION SYSTEM, comprise tethered airfoils, balloons, that support a plurality of wind turbines aloft. The turbines and generators are mounted within the lower end of a central tubular vent within the balloon. The wind turbines drive electric generators whose power goes to ground via power cables. In lieu of electric generators turbines drive flexible shafts that are connected to mechanical loads on the ground. A system of stay cables, anchored to the ground, peripherally disposed around the balloon, on powered winches, controls the heading and angle of attack of the balloon.

All of these above patents include lighter-than-air filled balloons. All but one of these patents have aircraft that are stayed; "stayed" meaning that the aircraft does not travel downwind. The one that does have aircraft that travel downwind, the Lois patent, uses the tractor principle of kites. Tractors are old art; carriages and boats and the like are towed across country and water. Tractor kites do work, force through distance, as they drag loads downwind. The presence of balloons in the above inventions indicates that these inventors seek to extract energy from wind at high altitudes; altitudes beyond the reach of windmills on ground mounted towers.

SUMMARY

Energy is gathered from wind by the system of the present invention only while its tethered aircraft travels downwind. The wind blows it downwind. While the aircraft travels downwind its tether is pulled from a windlass drum that is rotationally connected to the rotor of an electricity generator. The rotor of the generator spins and electricity is generated. The windlass drum and generator are anchored to the ground or to a slowly moving carriage.

The system of the present invention includes a cycle for generation of electrical power that is completed when the aircraft is travelled upwind to the site of the beginning of downwind travel where the cycle for generation of power is recommenced.

The downwind travel part of the cycle is at a controlled angle-of-attack that exceeds the stalling angle, reference above U.S. Pat. No. 5,931,416. At the end of downwind travel the unwinding of the tether from the drum is halted.

Three embodiments are included. For all three embodiments the power generating downwind travel part of the cycle is the same. Each embodiment is defined by its unique mode of return of the aircraft to the site of the beginning of downwind travel. The practice of the present invention may include parts of all three embodiments in any one actual cycle.

In the first embodiment, while at the end of downwind travel, when travel is stopped, the wind is caused to blow the aircraft upward to a maximal higher altitude by operating the angle-of-attack remote-control to decrease the angle-of-attack to much less than it had been during downwind travel. At maximal higher altitude another set of controls is operated to initiate and subsequently control the flight of the aircraft to glide upwind from maximal higher altitude downward to the starting point of the cycle power-generating, downwind-travel of the aircraft. The energy consumed in gliding the aircraft back to the cycle starting point is much less than the energy harvested from the power-generating, downwind-travel part of the cycle. Consequently, the cycle of this first embodiment has a net power output.

In the second embodiment the aircraft is towed back, the tether is reeled-in on the drum, to the starting point of downwind travel. The generator having been switched to motor operation so as to tow the aircraft back to the cycle starting point. An actual motor may be switched in in place of switching the generator to motoring. After the downwind-travel is halted the angle-of-attack remote-control is operated to decrease the angle-of-attack which minimizes the tether tension. Because of the minimized tension, the energy used to tow the aircraft back to the cycle starting point is less than the energy gathered during downwind, power generating, travel so that a net amount of energy is harvested from the cycle.

In the third embodiment the aircraft is again towed back, but instead of changing the angle-of-attack after the downwind-travel is halted an on-board mechanism is actuated that decreases the "equivalent supporting plane surface" area after the downwind-travel is halted; for definition of "supporting surface" see above cited U.S. Pat. No. 5,931, 416. So that, again, as in the above second embodiment, the tether tension is minimized during the return to the cycle start. Again, in this third embodiment a net amount of energy is harvested.

The downwind-travel-rate is controlled to gather energy from wind blowing at a particular velocity. The downwind travel rate is less than the wind velocity. It is explained further in the following description that if the downwind rate is too slow, little energy is gathered, also if the downwind rate is too fast, little energy is gathered. For gathering energy at the maximum rate from a particular wind there is a unique downwind-travel-rate between too slow and too fast.

Controls for accomplishing maximum energy gathering are included.

A manually controlled version of the present invention includes that the actual-downwind-travel-rate of the aircraft is measured and displayed to the human operator of the invention. It further includes that the wind velocity is measured and also displayed to the operator. The operator compares his observed wind velocity with stored data to obtained the corresponding required-downwind-travel-rate for maximum power generation. For any observed difference between the actual and the required-downwind-travel-rate the operator manually increases or decreases the field current to the generator. The change in field current increases or decreases the torque and consequently the unwinding rate of the tether from the drum, which is the same as changing the actual-downwind-travel-rate of the aircraft to match the required-downwind-travel-rate. Thus, to reduce the difference to zero and increase the generated power to maximum for the displayed wind velocity. The stored data is previously obtained by test and calculation.

An automatically controlled version of the present invention includes the measurement of the actual-downwind-travel-rate of the aircraft and the measurement of the wind velocity. The wind velocity is input to a transducer wherein it is compared automatically to stored data to obtain a measurement of the corresponding required-downwind-travel-rate for maximum power generation. Again, the stored data is previously obtained by test in combination with calculations. The measurements of the actual-downwind-travel-rate and of the required-downwind-travel-rate are input to an error-sensor, the summing junction, whose output signal is the difference between them. The output of the error-sensor is input to a system controller that, correspondingly to the difference, actuates a field current modulator to increase or decrease the field current to the generator. The result is to reduce the difference to zero and thus to increase the power generated to maximum for the measured wind velocity. The change in field current having increased or decreased the torque and consequently the unwinding rate of the tether from the drum, which is the same as changing the actual-downwind-travel-rate of the aircraft to match the required-downwind-travel-rate. The measurement of the actual-downwind-travel-rate is the feedback signal.

OBJECTS AND ADVANTAGES

An object of the present invention is to provide a system that employs a kite, a tethered aircraft, for gathering energy from wind.

An advantage is that a tethered aircraft can gather energy from wind at altitudes that far exceed the economically practical altitudes of windmills, which usually are mounted atop ground mounted towers. At such higher altitudes the winds are stronger and steadier than those near the ground.

An advantage of the present invention over such as those in the prior art citations above is that the need for the kite to hoist aloft on-board, electrical generators or wind wheels is eliminated.

An advantage of the system of the present invention is that its tethered aircraft can gather energy from wind at higher altitude without the support of a balloon, as exampled in the above prior-art patents. Balloons are costly to buy and to operate and often require complex controls.

An advantage of the present invention is that ground mounted towers that support windmills are not required. The cost of such towers and their foundations is avoided.

An advantage is that the feasibility of gathering energy from wind over water bodies, lakes and seas, is increased, for the present invention can be operated from a vessel or an island.

An advantage of the present invention that employs a kite is that it provides an alternative system for gathering energy from wind that includes advantages of existing wind energy gathering machines.

An advantage is that energy is abstracted from a renewable resource, the wind. Fuel is not consumed.

An advantage of the present invention is that it contributes no pollutants, such as dust, dirt, smoke, chemicals, and noise, to the land, or to the atmosphere, or to the waterbodies and rivers.

An advantage of the present invention is that it is not a threat to bird life, because it is without rotor blades that can travel close to the speed of sound.

Another object of the present invention is to provide a tethered aircraft system that has feedback control of the rate of downwind travel that is reset corresponding to fluxuating and gusting wind velocity to produces maximal power from wind as the aircraft travels downwind at precisely controlled rates.

An advantage of feedback control for maximal power generation is that operating time and expense is not wasted, because rates of downwind travel of the aircraft that are too slow to generate profitable power are avoided.

It is also an advantage of feedback control for maximal power generation that operating time and expense is not wasted, because rates of downwind travel of the aircraft that are too rapid to generate profitable power are avoided.

Further objects and advantages of my invention will become apparent from consideration of the drawings and ensuing description.

Figure 1:
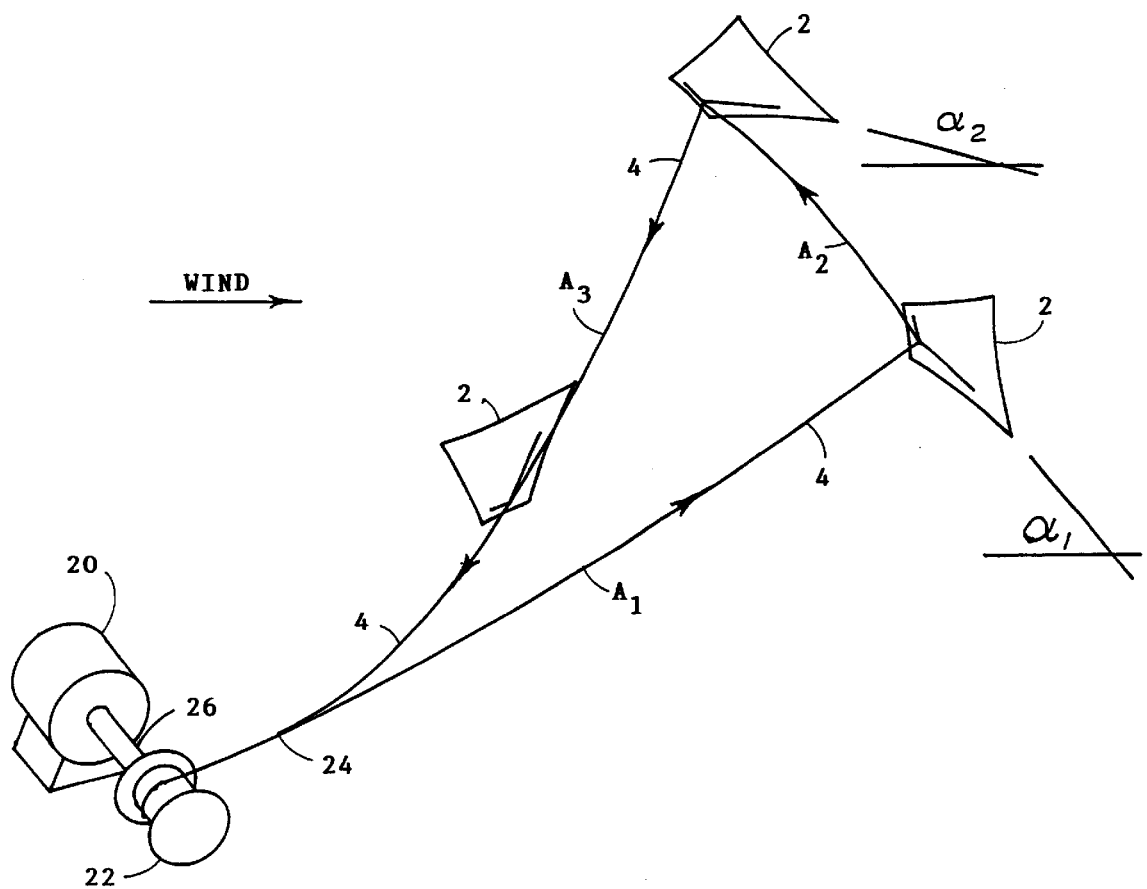
FIG. 1 is a schematic picture of a first embodiment of this invention. It is tethered aircraft 2 being blown downwind to generate power by pulling tether 4 from drum 22 so as to spin electricity generator 20. At the end of downwind travel, aircraft 2 is blown upward to a higher altitude from which it glides back to site 24, the beginning of the power generating cycle.

REFERENCES IN DRAWINGS 2 kite, tethered aircraft
4 tether
6 towing-point-transporter
8 angle-of-attack, α, control, —Prior Art—
20 electrical machine, electricity generator
22 windlass drum
24 cycle starting point
26 shafting
30 actual-downwind-travel-rate, $v_{ta}$, display
32 wind velocity, $V_o$, display
32A wind velocity, $V_o$, sensor
34 graph, required-downwind-travel-rate, $v_{tc}$, versus wind velocity, $V_o$
36 variable resistor, electric current, $I_f$, control, rheostatic
40 field current source, electrical
42 wind velocity, $V_o$, sensor-taransmitter
44 required-downwind-travel-rate, $v_{tc}$, signal generating transducer
46 actual-downwind-travel-rate, $v_{ta}$, sensor
46A detector part of sensor 46
48 summing junction, signal-error-sensor
50 automatic controller
52 field current control, $I_f$, modulator, rheostatic
54 supporting-wind velocity, $V_t$, sensor-transmitter
56 support for sensor 54
58 tether-inclination-angle, β, transmitting sensor
60 brackets for sensor 58
64 ambient-wind-velocity calculating transducer, $V_{oa}$
$A_1$ flight path
$A_2$ flight path
$A_3$ flight path
$A_4$ flight path
E control error signal, deviation
M controller output signal, modulates electric current $I_f$
$I_f$ field current to machine 20
$P_o$ percent of maximum power
F towing-point
$V_o$ surface wind velocity, proximal to the ground, relative to the ground
$V_{oa}$ ambient-wind-velocity-aloft, proximal to the kite, relative to the ground
$V_t$ sensed-wind-velocity-aloft, measured at the travelling kite, supporting-wind-velocity
$v_t$ downwind-travel-rate, upward along tether 4
$v_h$ horizontal travel rate, $v_h = v_t \times$ cosine β
$v_{ta}$ actual-downwind-travel-rate, upward along tether 4
$v_{tc}$ required-downwind-travel-rate, upward along tether 4
$α_1$ angle, angle-of-attack, "alpha$_1$"
$α_2$ angle, angle-of-attack, "alpha$_2$"
$α_3$ angle, angle-of-attack, "alpha$_3$"
$α_4$ angle, angle-of-attack, "alpha$_4$"
β angle, tether-inclination, "beta"

Figure 2:
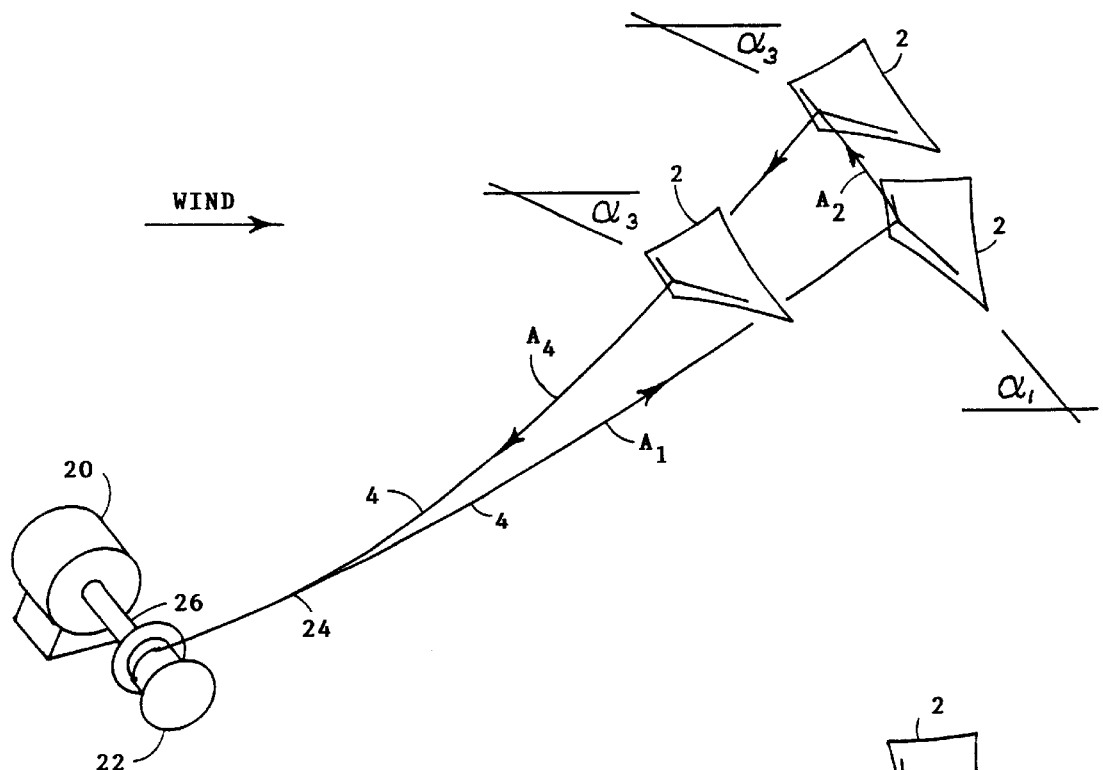
FIG. 2 is a schematic picture of a second embodiment. Instead of gliding back upwind to site 24, as shown in the above FIG. 1, drum 22 is motor driven to reel-in tether 4 so as to return aircraft 2 to site 24.
Figure 3:
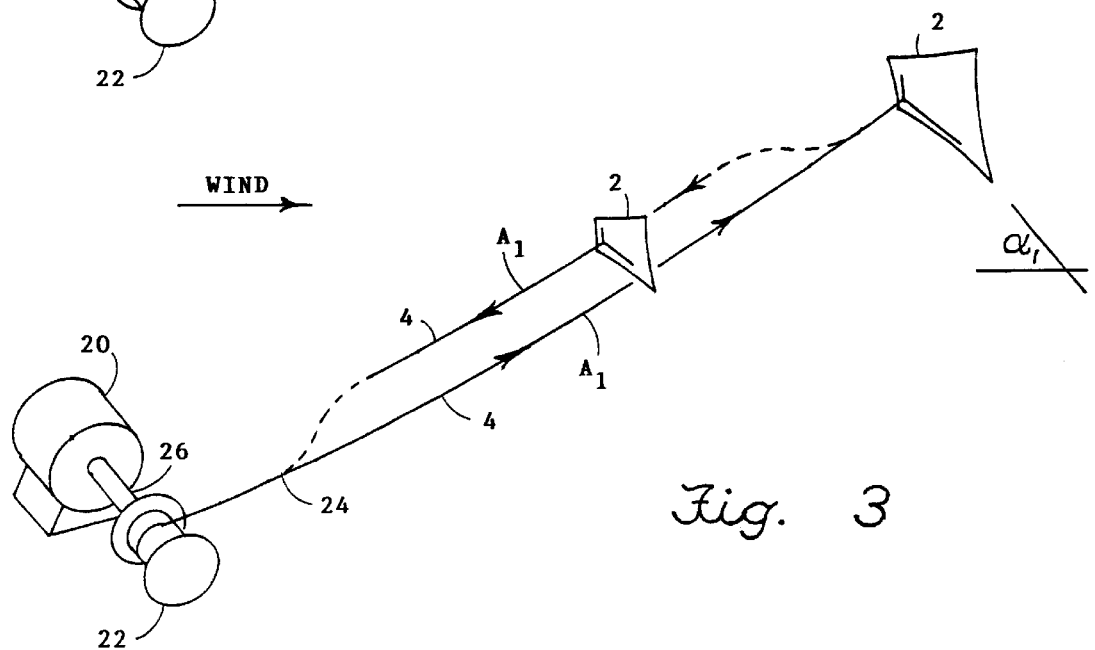
FIG. 3 is a schematic picture of a third embodiment. At the end of downwind travel supporting aerodynamic area is decreased, and, without first being risen to higher altitude, as shown in FIGS. 1 and 2, machine 20 motors drum 22 to reel-in tether 4 so as to return aircraft 2 to site 24.

FIGS. 1, 2, and 3 Description of Embodiments, the Cycles

FIGS. 1, 2, and 3 are diagrams of three different cycles of flight of a tethered aircraft system for gathering energy from wind. Each cycle includes a downwind flight and a return upwind flight to the starting point of downwind travel where the next cycle is recommenced. Each of the different cycles corresponds to one of three embodiments of the present invention. The downwind travel is identical for each embodiment. Energy is gathered by the tethered aircraft only during the downwind travel part of a cycle. The embodiments differ only in that each has a different mode of upwind return of the aircraft to the cycle starting point. Each of the return modes of upwind travel defines an embodiment of the present invention. Upwind-travel-mode-controls are included for controlling the amount of energy consumed during upwind travel of the aircraft to the site of the beginning of downwind travel to amount to less energy than the amount of energy that is generated by the aircraft during the downwind travel.

Mechanical energy is gathered from the wind as the aircraft travels downwind. In the three embodiments, FIGS. 1, 2, and 3, it is shown that tethered aircraft 2 is blown by the wind to travel downwind along flight path $A_1$. For the purpose of illustration, tether 4 is shown to coincide with path $A_1$. In FIGS. 1, 2, and 3 electrical machine 20, electricity generator 20, transforms rotational mechanical energy to electrical energy. The electrical energy is available to users at the terminals of machine 20. Tether 4 of tethered aircraft 2 is wound on windlass drum 22. Drum 22 is rotationally connected through mechanical power transmission apparatus 26 to the rotor of generator 20. Drum 22 is connected via shafting 26 to generator 20, FIGS. 1, 2, 3, 6, 7, and 8. Generator 20 and drum 22 are shown to be on the ground, remote from tethered aircraft 2, but they may be, as well, on board a land vehicle, or on board a watercraft, or on board another aircraft aloft. Tether 4 is pulled from drum 22 by the force of the wind on aircraft 2 as it travels downwind. The unwinding of tether 4 from drum 22 causes drum 22 and the interconnected rotor of generator 20 to rotate, and conseqently currents of electricity are generated as the generator's conductors cross through magnetic flux. Downwind travelling aircraft 2 pulls against the restraining torque of generator 20. The windlass drum and generator are anchored to the ground or to a slow carriage.

Downwind travel of aircraft 2 can continue even when the part of tether 4 that is proximal to drum 22 is no longer raised from the ground by the force of the wind as tether 4 is unwound from drum 22, FIG. 1. Control judgement may be taken to abbreviate the length of downwind travel.

During downwind travel along a path $A_1$ aircraft 2 flys at particular angle-of-attack $\alpha$ which angle is controlled to exceed the stalling angle. Refer to above cited U.S. Pat. No. 5,931,416, 1999, TETHERED AIRCRAFT HAVING REMOTELY-CONTROLLED ANGLE-OF-ATTACK, to me, Howard G Carpenter.

Futher, in the above cited, U.S. Pat. No. 5,931,416 "'Paraphrasing Mark's Handbook of Mechanical Engineering; for an airfoil at a critical angle of attack, called the "stalling angle" the flow which had been, at smaller angles, smooth over the upper surfaces breaks away, the lift decreases, and the drag increases."' The stalling angle of an airfoil, by this definition, is 25° or so. For this invention the definition, that I have originated, of the term "angle-of-attack" is the same as that in above cited, U.S. Pat. No. 5,931,416.

Ordinarily, kiters fly their kites as high as they can on fixed length tethers. The angle-of-attack in high flight is usually about the same or less than the stalling angle, and the pull is small compared to the pull when flight is lower where the angle-of-attack exceeds the stalling angle. In very high flight, if the supporting surfaces are aerodynamically curved, pull due circulation can be significant even though the angle-of-attack is much smaller than the stalling angle, but controls for very high flight in low velocity winds are to be developed. Consequently, it is elemental to the present invention that the aircraft has remotely-controlled angle-of-attack that exceeds the stalling angle while tether 4 is pullingly unwound from drum 22.

In the above cited U.S. Pat. No. 5,931,416 the angle-of-attack is controlled by driving the towing-point, the tether attachment point, towing-point F, from an initial location to a final location relative to the aircraft structure. A feedback control system is included; the measurement of the difference between the actual-angle-of-attack and the required-angle-of-attack actuates the towing point drive to reduce the difference to zero.

The first embodiment is diagrammed in FIG. 1. At the end of downwind travel the unwinding of tether 4 from drum 22 is halted. While downwind travel is stopped, the angle-of-attack $\alpha$ remote-control is operated to decrease particular angle-of-attack $\alpha_1$ to angle-of-attack $\alpha_2$ which causes the wind to blow aircraft 2 upward along path $A_2$ to maximal higher altitude. Angle-of-attack $\alpha_2$ is apt to be significantly less than the stalling angle.

Upon the arrival of aircraft 2 at maximal higher altitude additional controls are operated to initiate and subsequently control the flight of aircraft 2 to glide upwind along a path $A_3$ from maximal higher altitude downward back to site 24 at the beginning of downwind, power-generating travel of aircraft 2 along a path $A_1$, FIG. 1. Energy is neither consumed or gathered as aircraft 2 glides upwind along a path $A_3$ to site 24. However, a small amount of energy is consumed by the reeling-in of tether 4 on drum 22 as aircraft 2 glides upwind to site 24. Generator 20 is switched from generator operation to motor operation for reeling-in tether 4 in this first embodiment: generator 20 is similarly switched in the second and third embodiments. An actual motor (not shown) may be mechanically connected to the shaft of drum 22 and switched in to reel-in tether 4, instead of operating generartor 20 as a motor to reel-in tether 4.

The second and third embodiments are diagrammed in FIGS. 2 and 3. Each second and third embodiment has a different mode of return of aircraft 2 back, upwind, to site 24. Downwind travel is the same for all three embodiments. In the second and third embodiments, upon completion of downwind travel aircraft 2 is towed back, upwind, to site 24, instead of gliding back as in the first embodiment. Generator 20 is switched from generator operation to motor operation for towing aircraft 2 back. An actual motor (not shown) may be mechanically connected to the shaft of drum 22 and switched in to reel-in aircraft 2, instead of operating generartor 20 as a motor to reel-in aircraft 2.

In the second embodiment, FIG. 2, upon the completion of the downwind travel along path $A_1$ aircraft 2 is so controlled that the wind blows aircraft 2 upward along path $A_2$ to much less higher altitude than it is blown upward along path $A_2$ in the first embodiment, FIG. 1. Unlike in the first embodiment wherein aircraft 2 glides back upwind, in the second embodiment the altitude to which aircraft 2 is blown upward along path $A_2$, FIG. 2, is not high enough to enable aircraft 2 to glide back to starting point 24. Consequently, in the second embodiment aircraft 2 is towed back to point 24 since it is not glided back to starting point 24. It is shown in FIG. 2 that aircraft 2 travels downwind along path $A_1$, is blown upward along a shorter path $A_2$, and is towed back along path $A_4$ to point 24. The angle-of-attack remote control is actuated to convert the angle-of-attack from $\alpha_1$ to $\alpha_3$, which consequently causes the wind to blow aircraft 2 upward along path $A_2$. Angle-of-attack $\alpha_3$ is about the same as the stalling angle.

In the second embodiment because angle-of-attack $\alpha_3$ is much smaller than $\alpha_1$, the tension in tether 4 is much less as the aircraft is towed back to point 24 than is the tension in tether 4 during the downwind travel. Consequently, the energy used to tow the aircraft back to point 24 is less than the energy gathered during downwind travel so that, for the cycle, energy is gathered from the wind. But the energy gathered in the second embodiment is less than the energy gathered in the first embodiment.

In the third embodiment, FIG. 3, upon completion of downwind travel along path $A_1$, unlike in the first or second embodiments, aircraft 2 is towed back, upwind, to site 24 without first having the wind blow aircraft 2 to higher altitude along any path $A_2$. At the end of downwind travel mechanical apparatus is actuated to decrease the area of the equivalent supporting plane surface of aircraft 2 to only enough area to support flight as aircraft 2 is reeled-in to site 24. In the above cited U.S. Pat. No. 5,931,416 an ideal flat plate, referred to as an "equivalent supporting plane surface", is defined. In this embodiment aircraft 2 travels downwind along path $A_1$ and is towed back, upwind, along a reverse path that is similar to path $A_1$; path $A_1$ is more or less retraced during reel-in. During the return back, upwind, the angle-of-attack is controlled to be about the same, angle-of-attack $\alpha_1$, as it was at the end of downwind travel.

Like the second embodiment, in this third embodiment, even though the area of the supporting surface is decreased, the wind continues to blow against aircraft 2 during the upwind travel, the reel-in, so that force is required to pull aircraft 2 in to site 24. Energy is required to reel-in aircraft 2 to site 24. Because the area of the supporting surface is decreased, the energy required to reel-in aircraft 2 to site 24 is less than the energy gathered during the downwind travel so that there is a net energy output from the cycle.

In this third embodiment, like in the above second embodiment, electrical energy is consumed as aircraft 2 is motored in to site 24. Whereas in the first, typical, embodiment neglibible energy was required to glide aircraft 2 to site 24; in this third embodiment energy is required to reel-in along a reversed path $A_1$. The net energy of the cycle being the difference between the energy gathered during downwind travel and the energy to reel-in aircraft 2 against the wind. But the energy gathered in the third embodiment is less than the energy gathered in the first embodiment.

The practice of the present invention may include parts of all three embodiments in any one actual cycle.

Figure 4:
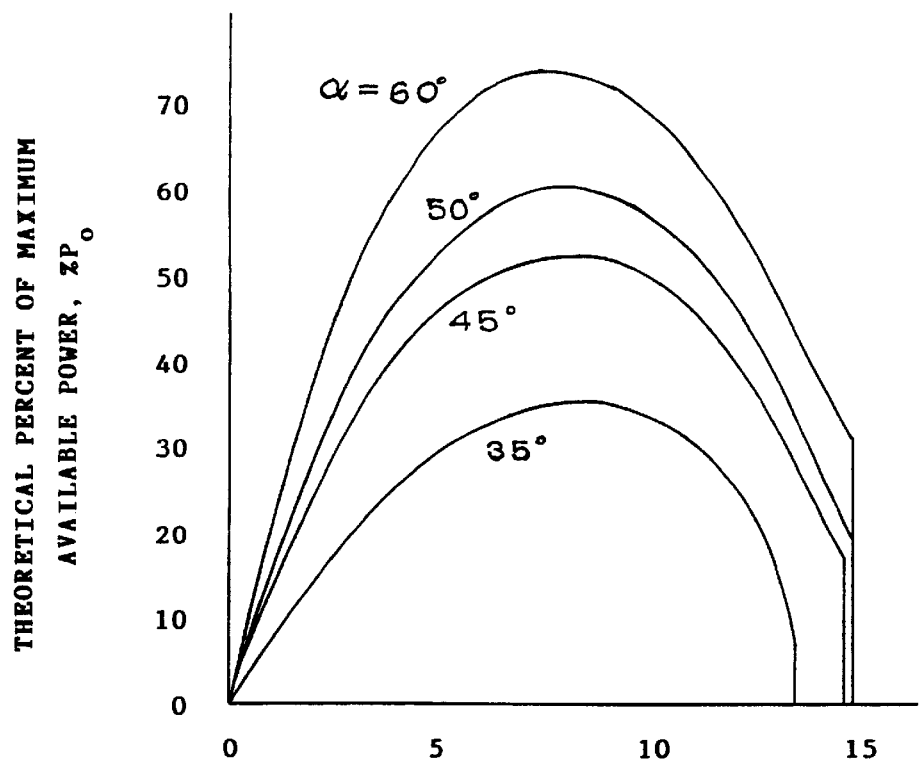
FIG. 4 shows, on a single set of coordinates, at four different angles-of-attack, graphs of percent of maximum power $P_o$ versus the downwind-travel-rate $v_t$ of a tethered aircraft; all in the same constant velocity wind $V_o$.
Figure 5:
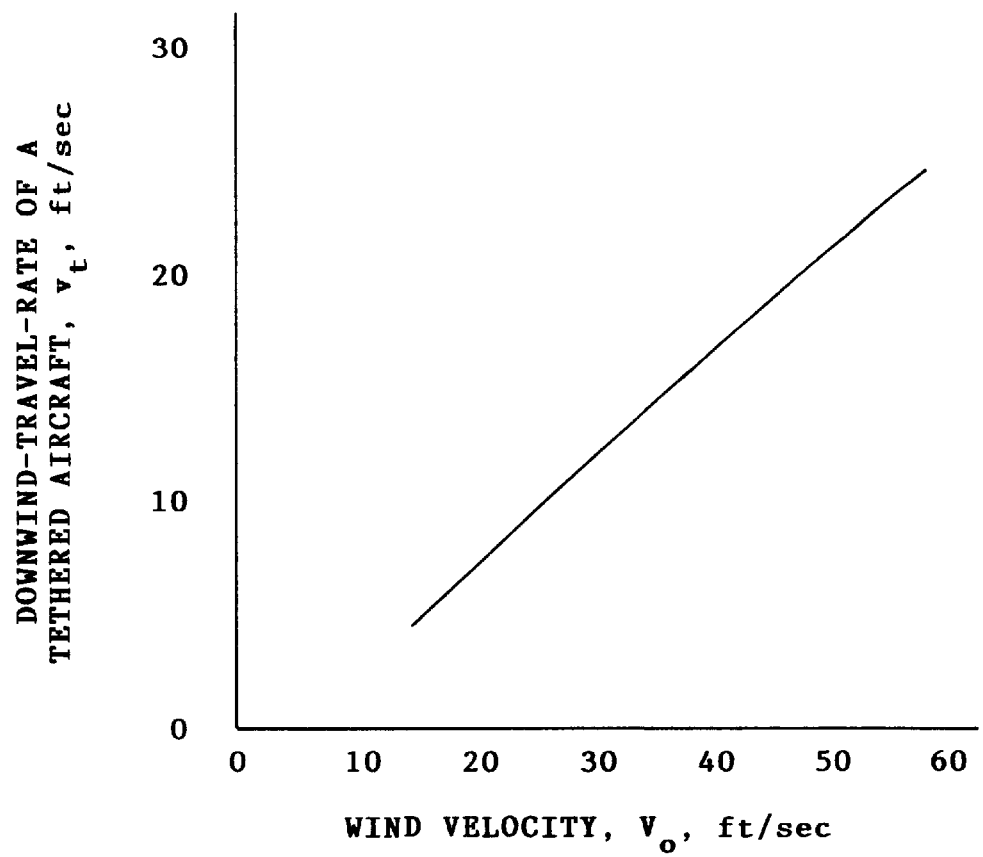
FIG. 5 is a graph of downwind-travel-rate $v_t$ at maximal power generation versus ambient winds of varying velocity $V_o$.

FIGS. 4 and 5 Description of Downwind-Travel-Rate for Power Generation

Graphs of percent of maximum power $P_o$ versus the downwind-travel-rate $v_t$ of a tethered aircraft at four different angles-of-attack, 35°, 45°, 50°, and 60° are shown in FIG. 4. The downwind-travel-rate, $v_t$ ft/sec, is the rate of travel of the tethered aircraft upward along the line-of-action of tension in tether 4. Downwind-travel-rate $v_t$ is relative to drum 22, FIG. 1. The bottom ends of tethers on ordinary tractor kites travel along the surface at the same velocity as the tractor kite. In the present invention, unlike with ordinary tractors, the bottom end of tether 4 is essentially fixed relative to the surface for it is fastened to drum 22 which is anchored to the ground or to a slowly moving carriage, wagon or boat. Conceivably the bottom end of tether 4 on drum 22 can be on board another aircraft aloft.

Each graph rises from zero percent of maximum power $P_o$ at zero downwind-travel-rate $v_t$. Percent power $P_o$ increases to maximum as downwind-travel-rate $v_t$ is increased. As downwind-travel-rate is continued to increase beyond the downwind-travel-rate for maximum percent power $P_o$ the graphs show that percent power $P_o$ decreases. At the extreme, well before the horizontal rate of travel $v_h$ becomes equal to $V_o$, the wind velocity, the graphs, FIG. 4, drop quickly to zero percentage power, $P_o$. The drop to zero is because the supporting wind velocity becomes insufficient to support the weight of the tethered aircraft so that it falls down to the ground.

When, with a particular aircraft, it is required to gather energy at the maximum rate from wind of velocity $V_o$ the graphs in FIG. 4 show that the downwind-travel-rate $v_t$ must be controlled to correspond to the maximum rate for maximum percentage power $P_o$, FIG. 4. Control systems for the control of downwind-travel-rate $v_t$ for maximal energy gathering from wind are diagrammed in FIGS. 6, 7, and 8.

A graph of downwind-travel-rate $v_t$ at maximum power generation versus varying velocities $V_o$ of surface wind is shown in FIG. 5. The graph is for an aircraft in flight at a remotely controlled angle-of-attack of 50°. Refer to above cited U.S. Pat. No. 5,931,416 for remotely controlled angle-of-attack. The graph in FIG. 5 illustrates data that is previously determined and stored in immediately accessesible form for control of the actual-downwind-travel-rate $v_{ta}$ for maximal power generation; see FIGS. 6, 7, and 8. The value taken from the data is the required-downwind-travel-rate $v_{tc}$ for gathering energy from the wind at the maximal rate. The control systems, FIGS. 6, 7, and 8, operate to measure the difference between the actual-downwind-travel-rate $v_{ta}$ and the required-downwind-travel-rate $v_{tc}$ and, also, to reduce the difference to zero. Thereby the system of the present invention operates to gather maximum power from fluxuating and gusting wind.

All the graphs in FIG. 4 apply to flight in the same constant velocity wind $V_o$. For example, 15 miles per hour. Wind velocity $V_o$ is the horizontal, ambient wind-velocity relative to the ground. The horizontal wind velocity measured at the downwind travelling aircraft is $(V_o-v_h)=V_r$.

The horizontal rate of travel $v_h$ is $v_t$ corrected to the horizontal; $v_h=v_t\times\text{cosine }\beta$. Angle $\beta$ is the inclination of the tether proximal to the aircraft. The inclination $\beta$ of the tether declines as the angle-of-attack is increased; at 35° the inclination is theorized to be 45° compared to 24° when the angle $\beta$ is 60°.

Each of the curves shown in FIG. 4 rise to a maximum of percent power, % $P_o$. It is seen in FIG. 4 that as the aircraft is controlled to fly at greater angles-of-attack the maximum percent of power % $P_o$ on each curve is increased. When angle-of-attack $\alpha$ is 90° power $P_o$ is 100% of maximum, however the inclination $\beta$ is zero; the tether is lying on the ground. A graph for $\alpha$=90° is not shown in FIG. 4. The ordinate of FIG. 4 is generalized as theoretical percent of maximum available power, % $P_o$, based upon the maximum power at an angle-of-attack of 90° of some particular aircraft, whose weight W and whose equivalent supporting surface area are known, that flies in a wind whose velocity is $V_o$.

The graphs shown in FIGS. 4 and 5 are obtained by the methods of physics and engineering. They may be confirmed by tests on actual aircraft in ambient wind. The graphs are generated by calculations based upon an equivalent supporting plane surface of the aircraft, defined in above cited U.S. Pat. No. 5,931,416.

No power is taken from an ordinary kite, because the length of the tether is fixed, and, consequently, the downwind-travel-rate $v_t$ is zero. It is, also, that no power is taken when the tether of an ordinary kite is released and the kite flys downwind without restraint. Power; the work per time. Work; force through distance. When the tether length is fixed there is no distance of travel, and when the kite's tether is released there is no restraining force, so that, in either case force and distance are not accomplished; no work can be done by the wind-blown kite on anything else; no power is taken. But when the tether is wound on a drum that has a brake and the brake is eased off enough, the kite will pull the tether from the drum and spin it. Then as the kite is allowed to fly downwind, slower than the wind, work is done which is heat generated in the brake; power is taken. Power is taken from the wind; energy is gathered from the wind. If the kite is too tightly braked it flys too slowly downwind, consequently the rate of doing work is small and the power is small; if the kite is too loosely braked it flys too rapidly downwind, consequently, because the restraining force is small, the rate of doing work is, also, small and also the power taken is small. But, ideally, if the brake is just tight enough or, all the same, is just loose enough, then a tethered aircraft having a given area of supporting surface flys downwind at just the right velocity for that aircraft to extract maximum mechanical power from the wind.

A useful and therefore valuable alternative to the brake is an electrical machine for transforming the rotational mechanical energy of the drum to electrical energy; a variety of electrical generator. The braking effect is accomplished by adjusting the field current to the generator which increases or decreases the torque that is required to spin the generator and the drum. The torque corresponds to tension in the tether. The torque is adjusted for conversion of maximum mechanical power from the wind to maximum electrical power. Then the power can be taken from the terminals of the machine by an electrical power system for direct use or for storage.

The torque on generator 20 is caused by and is functionally proportional to the rate of downwind travel and the field current.

The required-downwind-travel-rate $v_{tc}$ for gathering energy at maximum rate with a particular tethered aircraft flying in wind of known velocity is predetermined, FIG. 5, stored, and accessible for manual or automatic feedback control of the actual-downwind-travel-rate $v_{ta}$.

Figure 6:
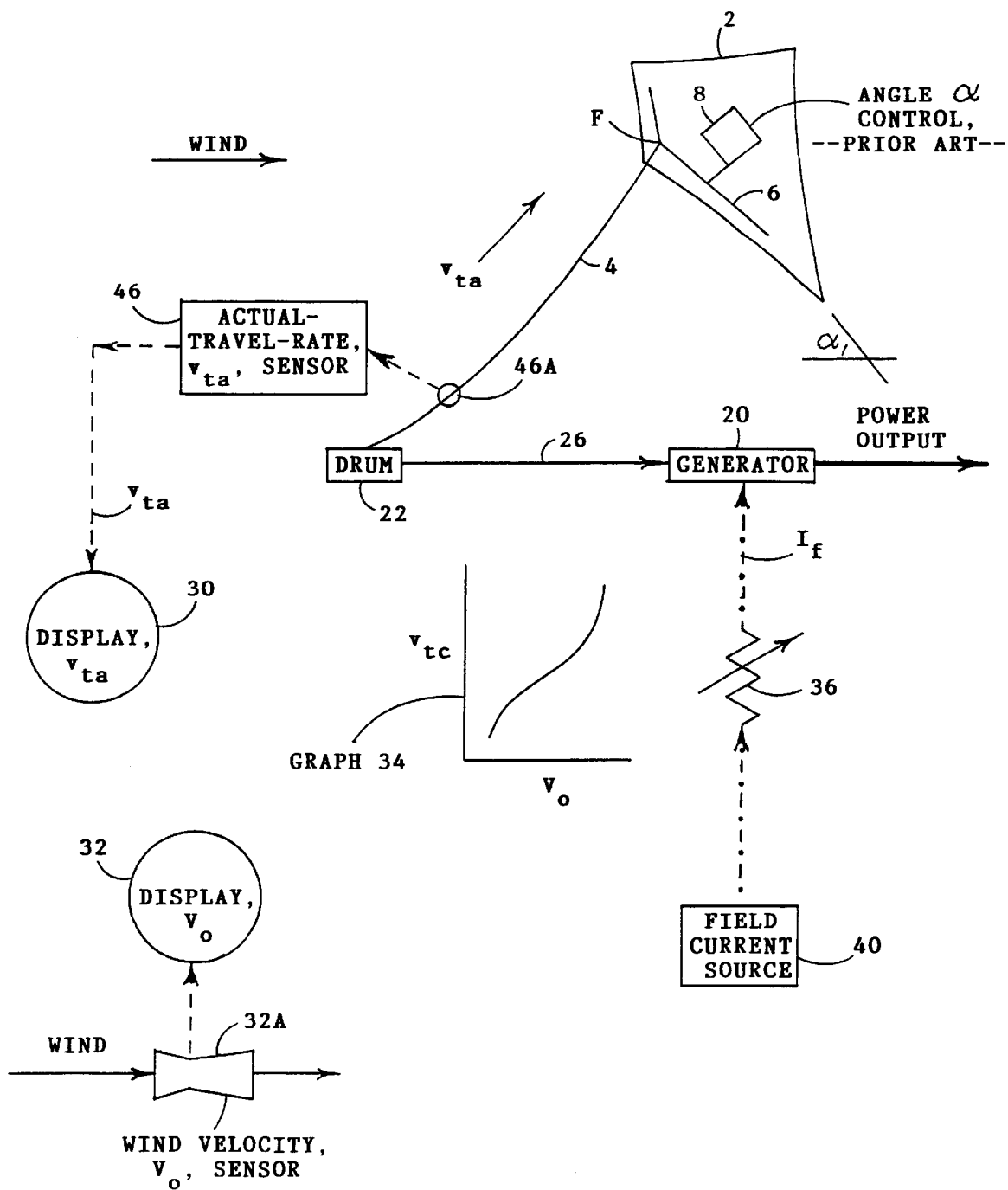
FIG. 6 is a diagram of a manually controlled tethered aircraft system for gathering energy from wind.
Figure 7:
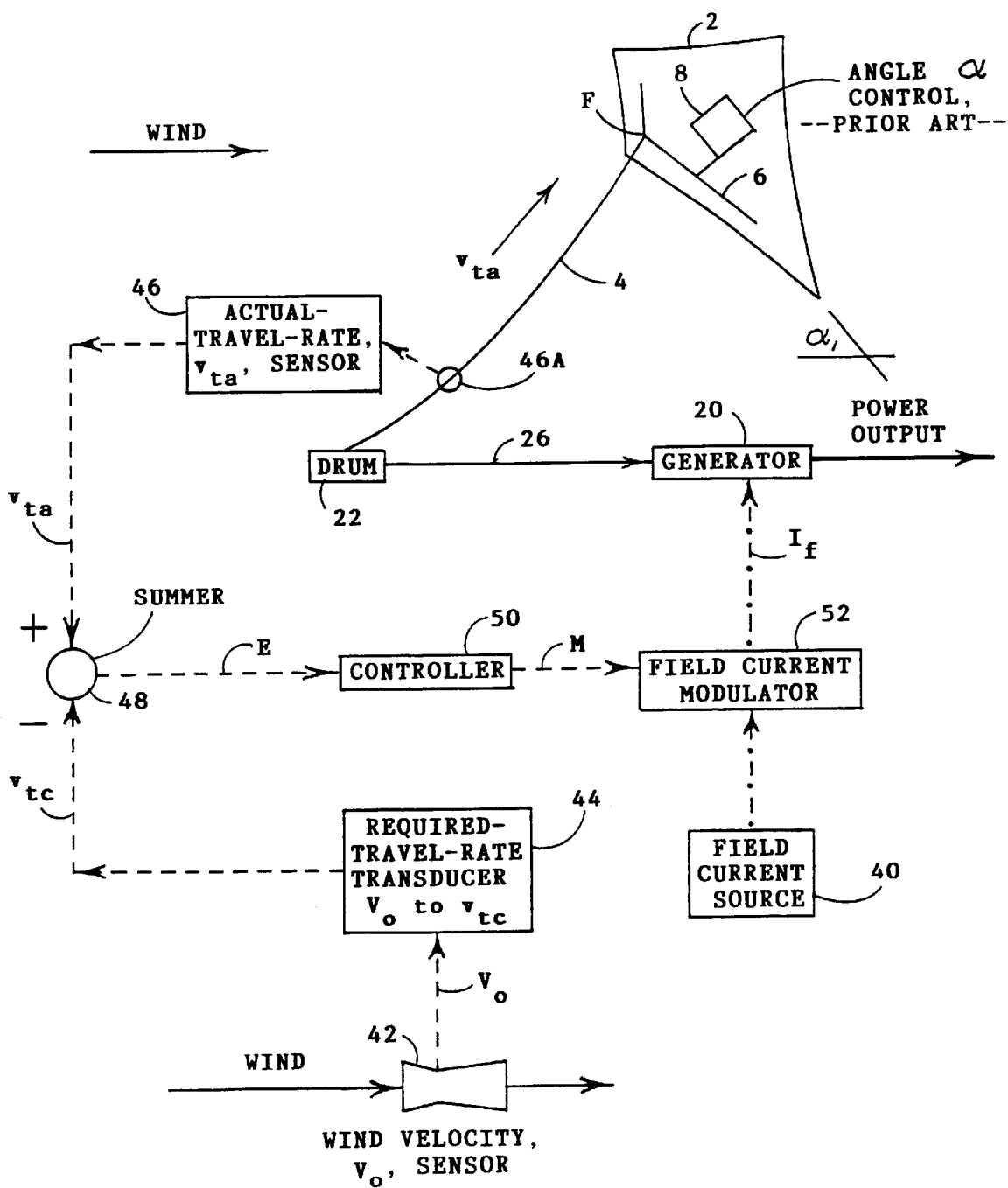
FIG. 7 is a diagram of an automatically controlled tethered aircraft system for gathering energy from wind.

FIGS. 6 AND 7 Description of the Downwind-Travel-Rate Controls for Maximal Power Generation The rate of travel downwind of the tethered aircraft is controlled to gather energy from wind at maximal rate. FIG. 6 is a diagram of a manual control system and FIG. 7 is a diagram of an automatic control system for gathering energy from wind.

Figure 8:
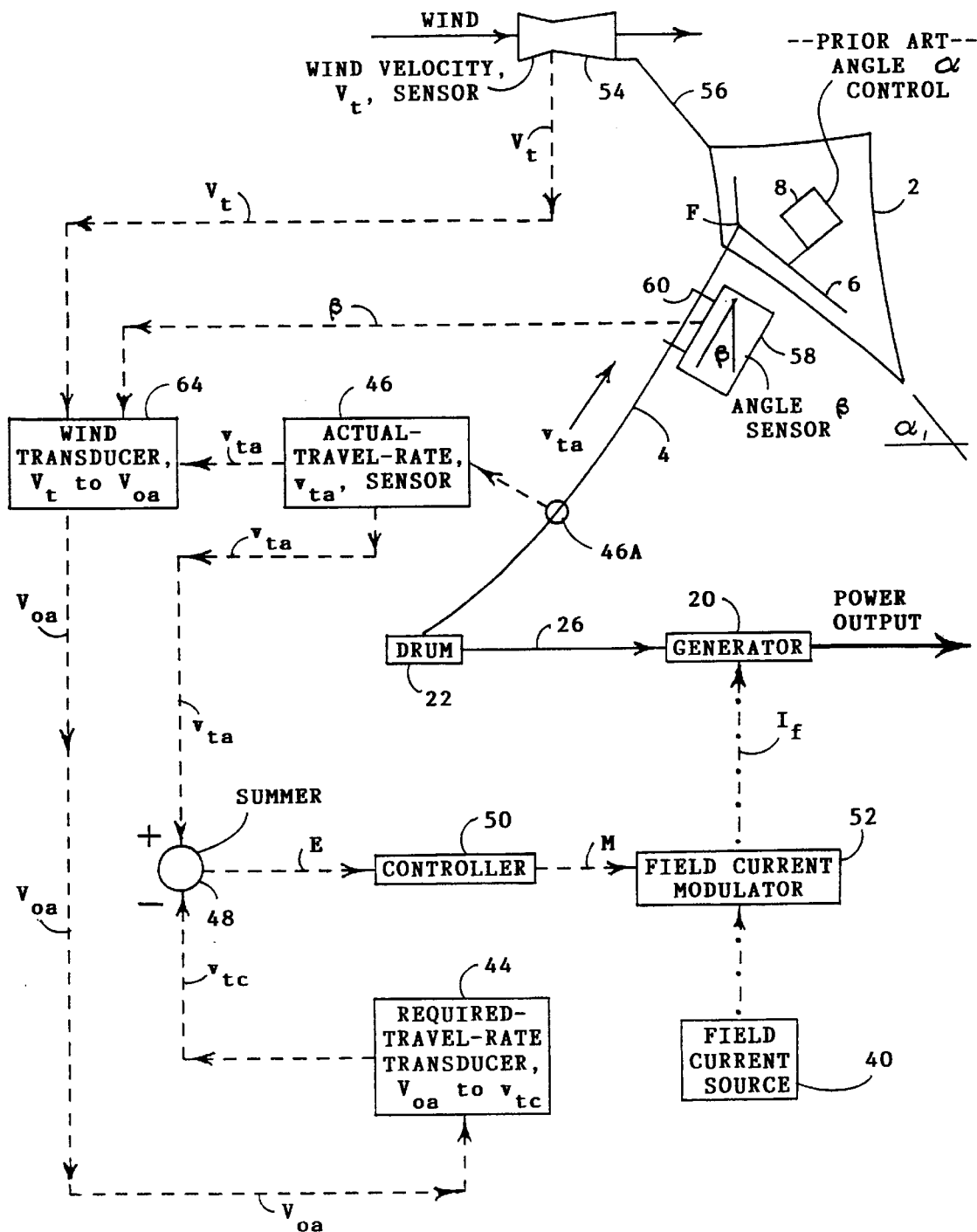
FIG. 8 is a diagram showing that the site of measurement of wind velocity is on board aircraft 2 instead of on the ground near drum 22 as shown in above FIG. 7.

In FIGS. 6, 7, and 8 control signals and data transmissions are represented by broken lines, and field current is represented by a dot and dash line; output power from generator 20 is represented by a heavy bold line. Field current source 40, FIGS. 6, 7, and 8 is a battery or any convenient source of current.

In FIGS. 6, 7, and 8 tethered aircraft 2 is pictured flying downwind at a controlled angle of attack $\alpha_1$. The angle-of-attack $\alpha$ control 8 is prior art under above cited U.S. Pat. No. 5,931,416, 1999, TETHERED AIRCRAFT HAVING REMOTELY-CONTROLLED ANGLE-OF-ATTACK, to me, Howard G Carpentwer. The arrow labeled $v_{ta}$ indicates that the actual-downwind-travel-rate $v_{ta}$ of aircraft 2 is upward along the line of action of tether 4 proximal to aircraft 2. Tether 4 is fastened to towing-point-transporter 6 of aircraft 2 at towing-point F.

In FIGS. 6, 7, and 8 actual-travel-rate $v_{ta}$ sensor 46 is a transducer that produces an output signal labeled $v_{ta}$ that represents the actual-downwind-travel-rate $v_{ta}$ of aircraft 2. The detector 46A part of sensor 46 can be any previously perfected device for measuring the rate of travel of a cord. Detector 46A may count the rate of passage of marks on tether 4. Or detector 46A may be a transmitting tachometer on the shaft of drum 22 or the interconnecting shafting 26. The tachometer is any previously perfected device for measuring rotation rate. For each revolution of drum 22 a circumferential length of tether 4 is payed out or hauled in. It is noted that the circumferential length of tether 4 is different for each layer of tether wrapped on drum 22. The speed of rotation is proportional to the pay out rate or haul in rate, the rate of travel $v_{ta}$ of tethered aircraft 2 downwind.

A manually controlled, human controlled, tethered aircraft system for gathering energy from wind is diagrammed in FIG. 6.

In FIG. 6 the actual-downwind-travel-rate $v_{ta}$ is displayed to the manual operator by indicator 30. The output signal that is produced by sensor 46 is input to indicator 30. The input signal to display 30 is functionally proportional to the actual-downwind-travel-rate, $v_{ta}$.

In FIG.6 wind velocity $V_o$ is displayed to the manual operator by indicator 32. The wind velocity $V_o$ is measured by sensor 32A. Pictured in FIGS. 6 as venturi like, wind velocity sensor 32A, is a previously perfected anemometer for sensing wind velocity $V_o$; similar venturi like sensors are pictured in FIGS. 6, 7, and 8. The actual-downwind-travel-rate $v_{ta}$ is measured, ideally, at the same time as the wind velocity $V_o$ is measured.

With wind velocity $V_o$ the manual operator enters graph 34, $v_{tc}$ versus $V_o$, FIG. 6, to know the required-downwind-travel-rate $v_{tc}$ for maximal power generation. Refer to FIG. 5 for $v_t$ versus $V_o$. For each particular value of the wind velocity $V_o$ there is a corresponding value of a required-downwind-travel-rate $v_{tc}$ for maximal power generation. The manual operator compares the actual-downwind-travel-rate $v_{ta}$ to his known required-downwind-travel-rate $v_{tc}$ and if he finds a difference in these rates he manipulates electrical resistor 36 to increase or decrease the field current $I_f$ to generator 20. Changes in field current to machine 20, generator 20, are for controlling the restraining torque of machine 20 and consequently controlling the downwind-travel-rate $v_{ta}$ of tethered aircraft 2 for generation of electricity. The values of the required-downwind-travel-rate $v_{tc}$, graph 34, FIG. 6, are obtained from predetermined and stored data.

To accomplish maximal power generation the manual operator seeks to reduce to zero any difference between the actual downwind rate $v_{ta}$ and required downwind rate $v_{tc}$ by modulating field current $I_f$ to generator 20 with resistor 36, modulator 36, FIG. 6. Modulator 36 is a previously perfected device for regulating electric current. There is likeness among resistor, rheostat, potentiometer, modulator, and other devices.

An automatically controlled tethered aircraft system for gathering energy from wind is diagrammed in FIG. 7.

In FIG. 7, unlike in FIG. 6, the output signal that is produced by sensor 46 is input to signal-error-sensor 48; summing junction 48, or signal comparator 48. The output signal produced by sensor 46 represents the actual-downwind-travel-rate, $v_{ta}$. FIG. 7 shows that signal summer 48 compares an input control signal that represents the actual-downwind-travel-rate $v_{ta}$ of aircraft 2 to an input control signal that represents the required-downwind-travel-rate $v_{tc}$ of aircraft 2. The automatically controlled system is like the above manually controlled system in that for each particular value of the wind velocity $V_o$ there is a corresponding value of a required-downwind-travel-rate $v_{tc}$ of the aircraft for maximal power generation.

Summer 48 produces an output signal, E, that is functionally proportional to any difference between the actual-downwind-travel-rate $v_{ta}$ signal and the required-downwind-travel-rate $v_{tc}$ signal. The output signal E, the error signal E, the deviation E, is input to controller 50. Controller 50 acts to reduce deviation E to zero by modulating field current $I_f$ to electrical machine 20. The output M of controller 50 is input to field current modulator 52, which rheostatically controls current, $I_f$, to electrical machine 20. Modulator 52 is a previously perfected device for regulating electric current. The response of machine 20 to changes in $I_f$ is to increase or decrease its speed so as to produce maximal power for any wind velocity by increasing or decreasing the unwinding rate of drum 22 and thereby providing the corrected actual-downwind-travel-rate $v_{ta}$ of aircraft 2 for maximal power generation.

Again, as in the above manual system, in the automatic system when the difference $(v_{tc} \pm v_{ta})$ approaches zero the actual-downwind-travel-rate $v_{ta}$ is controlled to gather energy from wind of fluxuating velocity at maximal rate; maximal power is generated.

Sensor 42, FIG. 7, provides measurements of the wind velocity $V_o$ to transducer 44. A signal representing wind velocity $V_o$ is transmitted by sensor 42 to required-downwind-travel-rate transducer 44. In FIG. 7, transducer 44 and its sensor 42 are located on the ground in the vicinity of drum 22 and machine 20. Sensor 42 is a previously perfected anemometer for sensing wind velocity $V_o$; similar venturi like sensors are pictured in FIGS. 6, 7, and 8.

Signals representing the required-downwind-travel-rate $v_{tc}$ are generated and transmitted by transducer 44 to summing junction 48. Transducer 44 provides signals representing values of $v_{tc}$ for maximal power generation corresponding to measured values of wind velocity $V_o$. In FIG. 7, the output line from transducer 44 that is labeled $v_{tc}$ represents the required-downwind-travel-rate of the aircraft for maximal power generation when the wind velocity is $V_o$. Values of $v_{tc}$ for maximal power generation, having been previously determined, are stored for access by the signal generation function of transducer 44. Values of maximal $v_{tc}$ that correspond to wind velocities $V_o$ are previously determined by test or engineering type calculations.

FIG. 8 Description of the Measurement of the Wind Velocity on Board the Aircraft in Flight The diagram in FIG. 8 is a partial copy of the diagram in FIG. 7. The exception is that in FIG. 8 the measurement of the wind velocity is taken proximally to aircraft 2 aloft in flight instead of on the ground proximally to drum 22 as shown in FIG. 7.

The wind velocity aloft is $V_{oa}$. Velocity $V_{oa}$ is relative to the ground even though it is the velocity of the wind aloft. Velocity $V_{oa}$ is of the wind that is ambient to aircraft 2.

The velocity of the surface wind is represented by $V_o$. The wind velocity aloft $V_{oa}$ is usually very different from the surface wind velocity $V_o$. The basis of the graph, FIG. 5, of the downwind travel rate for maximum power generation versus wind velocity $V_o$ is that the wind impinges upon the aircraft in flight. In the system for gathering energy from the wind that is diagrammed in FIG. 8, the wind that impinges upon aircraft 2 is the wind whose velocity aloft is $V_{oa}$, and the surface wind, whose velocity is $V_o$, does not impinge upon aircraft 2.

So that to achieve maximal energy gathering in the present invention, a system is provided for measuring $V_{oa}$, the impinging velocity, FIG. 8. The measurement of $V_{oa}$ is indirect because the velocity aloft that is sensed, measured, $V_t$ is different from $V_{oa}$ by $v_h$, the horizontal rate of travel of tethered aircraft 2. Wind velocity $V_t$ is measured by an anemometric device 54 that is mounted on board and travels with the downwind travelling aircraft 2.

The velocity measurement is indirect, because the sensed, measured, velocity $V_t$ is less than $V_{oa}$ by $v_h$, the horizontal rate of travel of tethered aircraft 2. Velocity $V_t$ is generally hoizontal. The horizontal wind velocity measured at the downwind travelling aircraft is $$V_t = (V_{oa} - v_h).$$

The horizontal rate of travel $v_h$ is $v_{ta}$, the actual-downwind-travel-rate, corrected to the horizontal, $$v_h = v_{ta} \times \text{cosine } \beta.$$

Angle $\beta$ is the inclination of the tether proximal to the aircraft. After eliminating $v_h$ from the above equations the combined equation for $V_{oa}$ is $$V_{oa} = V_t + v_{ta} \times \text{cosine } \beta.$$

The output signal from wind velocity sensor 54 is labeled $V_t$. Sensor 54 is a previously perfected anemometric device for sensing wind velocity $V_t$. Similar anemometric sensors, shown in FIGS. 6, and 7, are pictured as being venturi like, even though alternative anemometer types may serve as well. Sensor 54 transmits a signal that represents the sensed or measured wind velocity $V_t$ of the wind to ambient-wind-velocity calculating transducer 64. FIG. 8 shows that wind velocity sensor 54 is supported by mounting 56 from the structure of aircraft 2, aloft.

In FIG. 8, as is also shown in FIGS. 6 and 7, actual-travel-rate $v_{ta}$ sensor 46 is a transducer that produces an output signal labeled $v_{ta}$ that represents the actual-downwind-travel-rate $v_{ta}$ of aircraft 2. The arrow labeled $v_{ta}$ indicates that the actual-downwind-travel-rate $v_{ta}$ of aircraft 2 is inclined upward along the line of action of tether 4. A branch of output signal $v_{ta}$ from travel-rate sensor 46 is input to ambient-wind-velocity calculating transducer 64, FIG.8, while another branch of output signal $v_{ta}$ is input to summer 48, signal-error-sensor 48, the same as shown in FIG. 7.

A signal representing tether-inclination angle $\beta$ is generated by sensor-transmitter 58, FIG. 8. Tether-inclination angle signal is input to ambient-wind-velocity calculating transducer 64. Angle $\beta$ sensor-transmitter 58 includes any of a variety of perfected devices for measuring angles. Sensor-transmitter 58 is suspended and supported from tether 4 by hangers 60 (one shown) near the top end of tether 4, adjacent to towing-point F on towing-point-tranporter 6. The above referenced U.S. Pat. Nos. 5,533,694 and 5,931,416, to me, include descriptions of angle $\beta$.

The above three signals, $V_t$, $v_{ta}$, and $\beta$ are inputs to ambient-wind-velocity calculating transducer 64. These three signals are functionally converted by transducer 64 to the output signal that represents the wind velocity aloft $V_{oa}$, ambient to the aircraft, relative to the ground.

The function of ambient-wind-velocity calculating transducer 64 is to produce output signal $V_{oa}$ in accordance with the above combined equation. In FIG. 8 it is shown that the output $V_{oa}$ of transducer 64 is input to required-downwind-travel-rate transducer 44 which produces setpoint signal $v_{tc}$ that is input to signal-error-sensor 48 for system control.

Conclusion Ramifications and Scope

Thus it is seen that this invention depends upon an at-long-last reliable tractor kite that flys great distances downwind to great heights without mishap as it gathers energy from the wind.

It is seen, therefore, that the controlled angle-of-attack of the present invention contributes to the development of an economical practical tractor kite system for gathering energy from wind. There seems to be no limit to the size of the tethered aircraft that is blown downwind. The windjammers that sailed the worlds oceans, sailed from Boston and New York to San Francisco, had enormous sail area. It is supposed that very large well controlled tractor kites will be travelled miles downwind as they gather energy from wind. The development and later the continuing operation of the present system may well become an industry employing great numbers of people.

The present invention, a tethered aircraft system, a kite, for gathering energy from the wind is reminiscent of windmills. It has many of the advantages of windmills. The wind is a renewable, non-polluting source of energy unlike fuels; coal, oil, natural gas, other combustibles, and nuclear. Like windmills the present invention can be sited over any windy land or body of water.

Many advantages of the present invention are listed above. Energy is gathered from wind at altitudes that far exceed the economically practical altitudes of windmills. The cost of support towers and their foundations are eliminated. The accomodations of the sonic limits of current windmill blades are obviated.

Thus presented, this stable flier will travel great distances downwind, miles and miles, without dashing off into wild excursions. As it travels downwind at a controlled rate it will gather mechanical energy at maximal rate from fluxuating wind. The downwind travel rate is controlled by current day feedback techniques.

Although the description above contains many specifications, these should not be construed as limiting the scope of the invention but as merely providing illustrations of some of the presently preferred embodiments of this invention. For example, the energy gathered from the wind could be used to pump and to store water rather than to generate electricty with the above described machine 20.

Thus the scope of the invention should be determined by the appended claims and their legal equivalents, rather than by the examples given.

What is claimed is:

1. A tethered aircraft system for gathering energy from wind comprising:
   (a) electrical machine means for converting rotational mechanical energy to electrical energy, and
   (b) windlass drum means rotatively connected to the rotor of said machine means for having the tether of a tethered aircraft means wound on said drum means, and
   (c) said tethered aircraft means blown by wind to travel downwind for gathering mechanical energy from wind by said tethered aircraft means pullingly unwinding said tether from said drum means to rotate said drum means and to rotate said rotor against the restraining torque of said machine means so as to convert said rotational mechanical energy to said electrical energy available at the terminals of said machine means, and
   (d) a cycle for generation of electricity that is completed when said aircraft means is travelled upwind to the site of the beginning of said downwind travel where said cycle for generation of electricity is recommenced, and
   (e) remotely-controlled angle-of-attack means for controlling said aircraft means to fly in stall in force equilibrium in winds whose velocity fluxuates and gusts, and
   (f) during said downwind travel of said aircraft means said aircraft means is controlled by the action of said remotely-controlled angle-of-attack means to fly in stall in force equilibrium at particular angles-of-attack that exceed the stalling angle, and
   (g) upwind-travel-mode-control means for controlling the amount of energy consumed during upwind travel of said aircraft means to said site of said beginning of said downwind travel to amount to less energy than the amount of energy that is gathered by said aircraft means during said downwind travel, and
   (i) field current control means for controlling said restraining torque of said machine means and consequently for controlling the downwind-travel-rate of said tethered aircraft means for generation of electricity, and whereby the net amount of electricity obtained from said cycle is the difference between said mechanical unwinding energy from the wind that is converted to electricity and the minimal motive energy consumed in return-travelling said aircraft to said site of said beginning of said downwind travel, the net electrical energy is furnished to storage and to power users.

2. The tethered aircraft system for gathering energy from wind of claim 1 wherein said upwind-travel-mode-control means includes that, after said downwind travel is stopped, said remotely-controlled angle-of-attack means is controlled to decrease said angle-of-attack so as to cause the wind to blow said aircraft means to maximal higher altitude, whence attitude control means, including said remotely-controlled angle-of-attack means, for controlling said aircraft means to glide upwind from said maximal higher altitude downward to said site of said beginning of said downwind travel are actuated.

3. The tethered aircraft system for gathering energy from wind of claim 1 wherein said upwind-travel-mode-control means includes that, after said downwind travel is stopped, said remotely-controlled angle-of-attack means is controlled to decrease said angle-of-attack so as to cause the wind to blow said aircraft means to higher altitude, whence motor means for driving said drum means to reel-in said tethered aircraft means from said higher altitude to said site of said beginning of said downwind travel are actuated.

4. The tethered aircraft system for gathering energy from wind of claim 1 wherein said upwind-travel-mode-control means includes that, after said downwind travel is stopped, equivalent-supporting-plane-surface-area control means for decreasing the supporting area of said tethered aircraft to no more said supporting area than required to maintain flight are actuated, whence motor means for driving said drum means to reel-in said tethered aircraft means to said site of said beginning of said downwind travel are actuated.

5. The tethered aircraft system for gathering energy from wind of claim 1 wherein the location of said drum means and said machine means is remote, on the ground, or on board a land vehicle, or on board a watercraft, or on board another aircraft aloft from said tethered aircraft means aloft.

6. The tethered aircraft system for gathering energy from wind of claim 1, further including means for manually controlling said downwind-travel-rate of said tethered aircraft means for maximal mechanical energy gathering from wind whose velocity fluxuates and gusts comprising:
   (a) actual-downwind-travel-rate sensor-transmitter means for transmitting signals that represent measured values of the actual-downwind-travel-rate of said tethered aircraft means to indicating means for displaying the actual-downwind-travel-rate of said aircraft means to the manual operator, and
   (b) wind velocity sensor-transmitter means for transmitting signals that represent measured values of the wind velocity to indicating means for displaying the velocity of the wind to said manual operator, and (c) data display means for furnishing to said manual operator a predetermined required-downwind-travel-rate of said tethered aircraft means for maximal mechanical energy gathering that corresponds to each displayed velocity of the wind, and (d) manual adjusting means for manipulation of said field current control means by said manual operator to reduce to zero the difference that said manual operator detects between said actual-downwind-travel-rate of said tethered aircraft means and said required-downwind-travel-rate of said tethered aircraft means for maximal mechanical energy gathering.

7. The tethered aircraft system for gathering energy from wind of claim 6 wherein said data display means is a graph of said predetermined required-downwind-travel-rate of said tethered aircraft means for maximal mechanical energy gathering versus wind velocity.

8. The tethered aircraft system for gathering energy from wind of claim 1, futher including means for automatically controlling said downwind-travel-rate of said tethered aircraft means for maximal mechanical energy gathering from wind whose velocity fluxuates and gusts comprising:

(a) actual-downwind-travel-rate sensor-transmitter means for transmitting signals that represent measured values of the actual-downwind-travel-rate of said tethered aircraft means to signal-error-sensor means, and (b) wind velocity sensor-transmitter means for transmitting signals that represent measured values of the wind velocity to required-downwind-travel-rate transducer means, and (c) said required-downwind-travel-rate transducer means for transmitting to said signal-error-sensor means output signals that represent the required-downwind-travel-rate of said tethered aircraft means for maximal mechanical energy gathering in response to input signals that represent said measured values of the wind velocity, and (d) said signal-error-sensor means for measuring the differences between signals that represent said measured values of said actual-downwind-travel-rates and said required-downwind-travel-rates for maximal mechanical energy gathering and for transmitting signals that represent said measured differences to controller means, and (e) said controller means having functional response action for inputting control signals to said field current control means, and whereby the systemic action of said controller means automatically reduces the differences between said measured values of said actual-downwind-travel-rate and the values of said required-downwind-travel-rate for maximal mechanical energy gathering to zero.

9. The tethered aircraft system for gathering energy from wind of claim 8 wherein for each value of an input signal that represents a measured value of the wind velocity, said required-downwind-travel-rate transducer means includes a previously determined and accessibly stored, unique value of said required-downwind-travel-rate for maximal mechanical energy gathering.

10. The tethered aircraft system for gathering energy from wind of claim 9 wherein upon receipt of a said input signal, that represents said measured value of the wind velocity, the mechanism of said required-downwind-travel-rate transducer means produces and transmits an output signal to said signal-error-sensor means, which said output signal represents said required-downwind-travel-rate of said tethered aircraft means for maximal mechanical energy gathering.

11. The tethered aircraft system for gathering energy from wind of claim 8, further including means for sensing the supporting-wind-velocity at said tethered aircraft means aloft in flight and further including means for converting said sensed wind velocity aloft to ambient-wind-velocity-aloft which said converting means includes means for transmitting signals that represent said ambient-wind-velocity-aloft to said required-downwind-travel-rate transducer means comprising:

(a) supporting-wind-velocity sensor-transmitter means, mounted on board the structure of said tethered aircraft means, for transmitting signals that represent measured values of said supporting-wind-velocity to an ambient-wind-velocity-calculating transducer means, and (b) tether-inclination-angle sensor-transmitter means, mounted on said tether of said tethered aircraft means proximally to the end of said tether that is attached to said tethered aircraft means at the towing-point, for transmitting signals that represent measured values the tether-inclination-angle to said ambient-wind-velocity-calculating transducer means, and (c) actual-downwind-travel-rate sensor-transmitter means for transmitting signals that represent meaured values of the actual-downwind-travel-rate of said tethered aircraft means to said ambient-wind-velocity-calculating transducer means, and (d) said ambient-wind-velocity-calculating transducer means for operating on signals received from said supporting-wind-velocity sensor-transmitter means, and on signals received from said tether-inclination-angle sensor-transmitter means, and on signals received from said actual-downwind-travel-rate sensor-transmitter means to produce and transmit signals that represent said ambient-wind-velocity-aloft, proximal to said tethered aircraft aloft in flight, to said required-downwind-travel-rate transducer means, and whereby the control of said downwind-travel-rate for maximal generation of electricity is a function of said ambient-wind-velocity-aloft measured proximal to said tethered aircraft means aloft in flight instead of a function of less relevant surface wind velocity that is measured proximally to said drum means there on the ground.

\* \* \* \* \*